(No Model.)
J. THOMSON.
APPARATUS FOR CALIBRATING WATER METERS.
No. 476,095. Patented May 31, 1892.
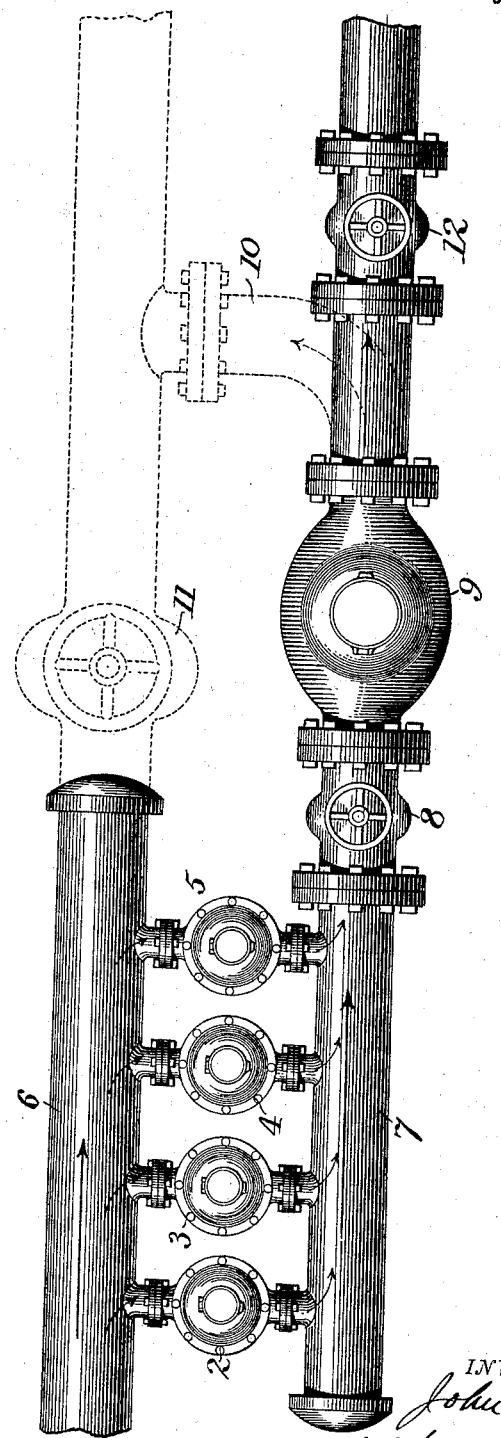

UNITED STATES PATENT OFFICE.

JOHN THOMSON, OF BROOKLYN, ASSIGNOR TO THE THOMSON METER COMPANY, OF NEW YORK, N. Y.

APPARATUS FOR CALIBRATING WATER-METERS.

SPECIFICATION forming part of Letters Patent No. 476,095, dated May 31, 1892.

Application filed May 12, 1891. Serial No. 392,451. (No model.)

*To all whom it may concern:*

Be it known that I, JOHN THOMSON, a citizen of the United States, residing in the city of Brooklyn, Kings county, State of New York, have invented certain Improvements in Apparatus for Calibrating Water-Meters, of which the following is a specification.

This is an invention in apparatus for calibrating water-meters, and is illustrated in the single figure of the drawing, representing a schematic plan view of the system which is particularly intended for and adapted to the calibration of water-meters of large capacity. Thus a plurality of small standardized meters, as 2, 3, 4, and 5, are placed in circuit between the main pipe or conduit 6 and the auxiliary branch or test pipe 7, having in its circuit a stop-valve 8 and the meter of large capacity 9 to be tested. Assume that the trial meter 9 is adapted to a twelve-inch pipe. Then four ordinary six-inch or eight four-inch meters would be approximately equal to its capacity. Now as it is common practice to construct meters in the four and six inch sizes capable of operating with great exactness at wide differences in rate of discharge it simply becomes necessary to provide a battery of such meters whose combined maximum capacity shall equal that of the meter to be standardized and to take the sum of the reading of all their registers whereby to obtain the coefficient applicable to the register of the larger meter or the necessary data to properly adapt it to indicate the total quantity. Such a testing-plant is comparatively inexpensive, very durable, and possessed of high efficiency and reliability. Then, too, where the conditions would permit, the discharge may be made back to the main, as indicated in the elbow 10, in which instance the stop-valves 11 12 would simply act to shunt the flow, either entire or in part, through the meters and the branch, as in the instance of a by-pass.

The difficulty of testing meters of large capacity will be appreciated by consideration of the fact that in the case of even a twelve-inch meter, if tested to a maximum capacity, it would require a flow equal to nearly five hundred cubic feet a minute. This system also provides for the complete test of the trial meter at all rates of flow. Thus when the rate of flow would be so low as to be liable to affect the accuracy of registration of the standard meters one or more of them may be cut out of circuit, by this means forcing those remaining in circuit to work up to their most favorable rate of operations. So, too, the element of time may be fully brought into the demonstration, as the trials may be conducted under all rates of flow for equal quantities, only the conditions of time and dynamic pressure in the trial meter being changed.

In the manufacture of inferential and proportional types of water-meters of large capacity one of the principal elements of their cost has been that of testing, as it has also been one of the chief difficulties in the way of their more extensive introduction and use, all of which is overcome in the present method and apparatus for carrying it out.

It is evident that the apparatus may be variously disposed; but in view of the fact that such a plant would be of value only to manufacturers or water-works departments possessed of ample technical knowledge in the art I have not thought it necessary to indicate modifications thereof, as the disclosure seems ample from the simple drawing submitted herewith.

What I claim is—

The combination of the main pipe, the auxiliary pipe, two or more standardized meters in circuit therewith, the trial meter connected to the auxiliary pipe, the elbow connecting the auxiliary and main pipes, and valves 11 and 12, for the purpose set forth.

In testimony whereof I have signed my name to this specification in the presence of two subscribing witnesses.

JOHN THOMSON.

Witnesses:
HENRY C. FOLGER,
J. F. COFFIN.